United States Patent
Burns et al.

(10) Patent No.: US 9,963,592 B2
(45) Date of Patent: *May 8, 2018

(54) MODIFIED COLORANTS AND INKJET INK COMPOSITIONS COMPRISING MODIFIED COLORANTS

(71) Applicant: Cabot Corporation, Boston, MA (US)

(72) Inventors: Elizabeth G. Burns, Windham, NH (US); James A. Belmont, Acton, MA (US); Robert J. Nick, Pepperell, MA (US); Feng Gu, Westford, MA (US)

(73) Assignee: Cabot Corporation, Boston, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/643,605

(22) Filed: Jul. 7, 2017

(65) Prior Publication Data

US 2017/0306156 A1 Oct. 26, 2017

Related U.S. Application Data

(63) Continuation of application No. 11/590,170, filed on Oct. 31, 2006, now Pat. No. 9,725,598.

(Continued)

(51) Int. Cl.

| | |
|---|---|
| *C08K 9/04* | (2006.01) |
| *C09B 67/00* | (2006.01) |
| *C09C 3/10* | (2006.01) |
| *C09D 11/322* | (2014.01) |
| *B82Y 30/00* | (2011.01) |
| *C08K 5/00* | (2006.01) |
| *C09B 67/04* | (2006.01) |
| *C09B 67/08* | (2006.01) |
| *C09B 67/22* | (2006.01) |
| *C09B 67/46* | (2006.01) |
| *C09C 1/56* | (2006.01) |
| *C09D 11/32* | (2014.01) |
| *C09D 11/324* | (2014.01) |
| *C09D 11/36* | (2014.01) |
| *C08K 3/04* | (2006.01) |
| *C08K 3/08* | (2006.01) |

(Continued)

(52) U.S. Cl.
CPC .............. *C09B 68/41* (2013.01); *B82Y 30/00* (2013.01); *C08K 5/0041* (2013.01); *C09B 67/0001* (2013.01); *C09B 67/0002* (2013.01); *C09B 67/0008* (2013.01); *C09B 67/0013* (2013.01); *C09B 67/0034* (2013.01); *C09B 67/0085* (2013.01); *C09B 68/24* (2013.01); *C09B 68/4253* (2013.01); *C09B 68/44* (2013.01); *C09B 68/463* (2013.01); *C09B 68/4677* (2013.01); *C09C 1/56* (2013.01); *C09C 1/565* (2013.01); *C09C 3/10* (2013.01); *C09D 7/41* (2018.01); *C09D 7/62* (2018.01); *C09D 11/32* (2013.01); *C09D 11/322* (2013.01); *C09D 11/324* (2013.01); *C09D 11/36* (2013.01); *C01P 2004/62* (2013.01); *C01P 2004/64* (2013.01); *C01P 2006/12* (2013.01); *C01P 2006/80* (2013.01); *C08K 3/013* (2018.01); *C08K 3/04* (2013.01); *C08K 3/08* (2013.01); *C08K 9/04* (2013.01); *C08K 9/08* (2013.01); *C08L 101/02* (2013.01)

(58) Field of Classification Search
CPC .. B82Y 30/00; C01P 2004/62; C01P 2004/64; C01P 2006/12; C01P 2006/80; C08K 3/0033; C08K 3/04; C08K 3/08; C08K 5/0041; C08K 9/04; C08K 9/08; C08L 101/02; C09B 67/0001; C09B 67/0002; C09B 67/0008; C09B 67/0013; C09B 67/0034; C09B 67/0085; C09B 68/24; C09B 68/41; C09B 68/4253; C09B 68/44; C09B 68/463; C09B 68/4677; C09C 1/56; C09C 1/565; C09C 3/10; C09D 11/32; C09D 11/322; C09D 11/324; C09D 11/36; C09D 7/007; C09D 7/1225

See application file for complete search history.

(56) References Cited

U.S. PATENT DOCUMENTS

| | | | |
|---|---|---|---|
| 3,446,641 | A | 5/1969 | Mitchell et al. |
| 3,532,662 | A | 10/1970 | Ansdell |

(Continued)

FOREIGN PATENT DOCUMENTS

| | | |
|---|---|---|
| AU | 2004226226 | 10/2004 |
| EP | 0403797 | 12/1990 |

(Continued)

OTHER PUBLICATIONS

International Search Report and The Written Opinion of the International Searching Authority for International Application No. PCT/US2006/042347, dated Jul. 17, 2007.

(Continued)

*Primary Examiner* — Shuangyi Abu Ali

(57) ABSTRACT

The present invention relates to a modified colorant comprising a colorant having at least one polymer attached or adsorbed thereto. The polymer comprises at least one functional group, and various embodiments of the functional group are disclosed. For each of these embodiments, preferably the functional group has a defined calcium index value. Also disclosed are various uses for these modified colorants, including inkjet ink compositions. Thus, the present invention further relates to an inkjet ink composition comprising a) a liquid vehicle, b) at least one colorant, and c) at least one polymer comprising at least one functional group as described herein.

11 Claims, No Drawings

Related U.S. Application Data

(60) Provisional application No. 60/731,721, filed on Oct. 31, 2005, provisional application No. 60/815,305, filed on Jun. 21, 2006, provisional application No. 60/815,326, filed on Jun. 21, 2006, provisional application No. 60/815,327, filed on Jun. 21, 2006.

(51) Int. Cl.
*C08K 9/08* (2006.01)
*C08L 101/02* (2006.01)

(56) References Cited

U.S. PATENT DOCUMENTS

| | | | |
|---|---|---|---|
| 4,150,020 A | 4/1979 | Swidler et al. | |
| 4,491,481 A | 1/1985 | Robertson et al. | |
| 4,698,431 A | 10/1987 | Raymond et al. | |
| 4,860,829 A | 8/1989 | Carlberg et al. | |
| 4,882,225 A | 11/1989 | Fukui et al. | |
| 5,281,261 A | 1/1994 | Lin | |
| 5,500,141 A | 3/1996 | Kormann et al. | |
| 5,624,901 A | 4/1997 | Raymond et al. | |
| 5,630,868 A | 5/1997 | Belmont et al. | |
| 5,672,198 A | 9/1997 | Belmont | |
| 5,698,016 A | 12/1997 | Adams et al. | |
| 5,707,432 A | 1/1998 | Adams et al. | |
| 5,708,095 A | 1/1998 | Page et al. | |
| 5,713,993 A | 2/1998 | Page et al. | |
| 5,750,594 A | 5/1998 | Page et al. | |
| 5,795,376 A | 8/1998 | Ide | |
| 5,803,959 A | 9/1998 | Johnson et al. | |
| 5,837,045 A | 11/1998 | Johnson et al. | |
| 5,854,191 A | 12/1998 | Krause et al. | |
| 5,885,335 A | 3/1999 | Adams et al. | |
| 5,922,118 A | 7/1999 | Johnson et al. | |
| 5,958,999 A | 9/1999 | Bates et al. | |
| 6,042,643 A | 3/2000 | Belmont et al. | |
| 6,090,193 A * | 7/2000 | Nigam | C09D 11/30 106/31.13 |
| 6,150,433 A | 11/2000 | Tsang et al. | |
| 6,187,086 B1 | 2/2001 | Rehman | |
| 6,203,909 B1 | 3/2001 | Chassot | |
| 6,204,307 B1 | 3/2001 | Miyabayashi | |
| 6,210,473 B1 | 4/2001 | Boils et al. | |
| 6,214,100 B1 | 4/2001 | Parazak et al. | |
| 6,221,476 B1 | 4/2001 | Bruening et al. | |
| 6,221,932 B1 | 4/2001 | Moffatt et al. | |
| 6,281,267 B2 | 8/2001 | Parazak | |
| 6,323,257 B1 | 11/2001 | Moffatt et al. | |
| 6,328,894 B1 | 12/2001 | Chan et al. | |
| 6,395,805 B1 | 5/2002 | Takao | |
| 6,458,458 B1 | 10/2002 | Cooke et al. | |
| 6,506,706 B1 | 1/2003 | Bruening et al. | |
| 6,533,851 B2 | 3/2003 | Lee et al. | |
| 6,538,047 B1 | 3/2003 | Miyabayashi | |
| 6,544,422 B2 | 4/2003 | Tarbet et al. | |
| 6,585,817 B2 | 7/2003 | Lee et al. | |
| 6,592,657 B2 | 7/2003 | Lee et al. | |
| 6,623,644 B2 | 9/2003 | Bruening et al. | |
| 6,641,653 B2 | 11/2003 | Yu | |
| 6,641,656 B2 | 11/2003 | Yu et al. | |
| 6,653,367 B2 | 11/2003 | Miyabayashi | |
| 6,719,905 B2 | 4/2004 | Bruening et al. | |
| 6,723,783 B2 | 4/2004 | Palumbo et al. | |
| 6,814,789 B2 | 11/2004 | Uhlir-Tsang et al. | |
| 6,831,194 B2 | 12/2004 | Srinivas | |
| 6,833,026 B2 | 12/2004 | Palumbo | |
| 6,866,707 B2 | 3/2005 | Kato | |
| 6,896,726 B2 | 5/2005 | Bugnon et al. | |
| 6,916,367 B2 | 7/2005 | Palumbo | |
| 6,960,250 B2 | 11/2005 | Luethge et al. | |
| 7,005,004 B2 | 2/2006 | Kalbitz et al. | |
| 7,160,377 B2 | 1/2007 | Zoch et al. | |
| 7,300,504 B2 | 11/2007 | Shakhnovich | |
| 7,347,894 B2 | 3/2008 | Yanagimoto et al. | |
| 7,393,403 B2 | 7/2008 | Lee et al. | |
| 7,427,361 B2 | 9/2008 | Small et al. | |
| 7,459,491 B2 | 12/2008 | Tyvoll et al. | |
| 7,501,017 B2 | 3/2009 | Sarkisian et al. | |
| 2002/0147252 A1 | 10/2002 | Adams et al. | |
| 2004/0265348 A1* | 12/2004 | Hollenberg | A61K 8/11 424/401 |
| 2006/0089422 A1 | 4/2006 | Vasudevan et al. | |
| 2006/0243165 A1 | 11/2006 | Luethge et al. | |
| 2007/0044682 A1 | 3/2007 | Nick et al. | |
| 2007/0126839 A1 | 6/2007 | Kelly-Rowley et al. | |
| 2007/0277699 A1 | 12/2007 | Bauer | |
| 2008/0083347 A1 | 4/2008 | Palumbo | |

FOREIGN PATENT DOCUMENTS

| | | |
|---|---|---|
| EP | 1088865 | 4/2001 |
| EP | 1321493 | 6/2003 |
| EP | 1061106 | 8/2003 |
| GB | 2373789 | 6/2004 |
| GB | 2385331 | 4/2005 |
| JP | 03/193357 | 8/1991 |
| JP | 2002/167529 | 6/2002 |
| JP | 2002/371213 | 12/2002 |
| JP | 2004/075825 | 3/2004 |
| JP | 2005/029606 | 3/2005 |
| JP | 2005/225955 | 8/2005 |
| WO | WO 95/04109 | 2/1995 |
| WO | WO 97/12944 | 4/1997 |
| WO | WO 01/92359 | 12/2001 |
| WO | WO 05/090486 | 9/2005 |
| WO | WO 2005/090458 | 9/2005 |
| WO | WO 05/123855 | 12/2005 |

OTHER PUBLICATIONS

International Preliminary Report on Patentability for International Application No. PCT/US2006/042347, dated May 15, 2008.

Furia, T., Stability Constants of Various Metal Chelates, Chapter 6—Sequestrants in Foods, by Thomas E. Furia, in CRC Handbook of Food Additiv, 2nd Ed., 1972.

Popov, K., et al., Stability Constants Data Sourses. Reliability. Algorithms and a Software for the Data Verification, The First International Proficiency Testing Conference, Romania, Oct. 11-13, 2007.

Popov, K., et al., Critical Evaluation of Stability Constants of Phosphonic Acids**, Pure Appl. Chem., vol. 73, No. 10, 2001, pp. 1641-1677.

Lukes, Ivan, et al., Aminomethylenephosphinic Acids and their Complexing Properties, J. Chem. Soc. Dalton Trans. 1992, pp. 939-944.

Siepak, Jerzy, Chelating Tendencies of N(Picolylamine) Salicylphosphinic and N(Picolylamine) Salicylphosphonic Acids, Their Synthesis and Acid-Basic Properties, Polish Journal of Chemistry, 1985, pp. 652-663.

Siepak, Jerzy, Synthesis, Acid-Basic Properties and Chelating Tendency of Aminophosphonic and Aminophosphinic Acids with Changing Analytical-Functional Groups, Polish Journal of Chemistry, 1985, pp. 955-969.

* cited by examiner

MODIFIED COLORANTS AND INKJET INK COMPOSITIONS COMPRISING MODIFIED COLORANTS

CROSS-REFERENCE TO RELATED APPLICATIONS

This patent application is a continuation of U.S. application Ser. No. 11/590,170 filed Oct. 31, 2006, which claims the benefit of U.S. Provisional Patent Application No. 60/731,721, filed Oct. 31, 2005, U.S. Provisional Patent Application No. 60/815,305, filed Jun. 21, 2006, U.S. Provisional Patent Application No. 60/815,327, filed Jun. 21, 2006, and U.S. Provisional Patent Application No. 60/815,326, filed Jun. 21, 2006.

BACKGROUND OF THE INVENTION

1. Field of the Invention

The present invention relates to specific modified colorants and inkjet ink compositions comprising these modified colorants.

2. Description of the Related Art

The surface of pigments contains a variety of different functional groups, and the types of groups present depend on the specific class of pigment. Several methods have been developed for grafting materials and, in particular, polymers to the surface of these pigments. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Methods for the preparation of modified pigment products have also been developed which can provide a pigment with a variety of different attached functional groups. For example, U.S. Pat. No. 5,851,280 discloses methods for the attachment of organic groups onto pigments including, for example, attachment via a diazonium reaction wherein the organic group is part of the diazonium salt.

Other methods to prepare modified pigments, including those having attached polymeric groups, have also been described. For example, PCT Publication No. WO 01/51566 discloses methods of making a modified pigment by reacting a first chemical group and a second chemical group to form a pigment having attached a third chemical group. Ink compositions, including inkjet inks, containing these pigments are also described. In addition, U.S. Pat. Nos. 5,672,198, 5,922,118, 6,042,643, and 6,641,656 disclose modified pigments having various attached groups, including phosphonic acid groups.

While these methods provide modified pigments having attached groups, there remains a need for modified pigments having improved performance properties in compositions such as inkjet inks, thereby providing advantageous alternatives to previous modified pigments.

SUMMARY OF THE INVENTION

The present invention relates to a modified colorant comprising a colorant having attached at least one polymeric group which comprises a polymer having at least one functional group. In a first embodiment, the functional group comprises at least one phosphonic acid group, partial ester thereof, or salts thereof, and preferably comprises at least two phosphonic acid groups, partial esters thereof, or salts thereof. In a second embodiment, the functional group comprises at least one hydroxamic acid group or salt thereof. In a third embodiment, the functional group comprises at least one heterocyclic group having at least one OH group or salt thereof. In a fourth embodiment, the functional group comprises at least one phosphonic acid group or salt thereof and at least one second ionic, ionizable, or basic group. In a fifth embodiment, the functional group comprises at least one heteroaryl group having at least one carboxylic acid group or salt thereof. In a sixth embodiment, the functional group comprises an aryl group having at least one nitroso group and at least one OH group, or a salt thereof. In a seventh embodiment, the functional group comprises an azoarene group having at least one OH group, at least one $NH_2$ group, or at least one OH group and at least one $NH_2$ group and has the formula $Ar^1$—N=N—$Ar^2$, wherein $Ar^1$ and $Ar^2$, which can be the same or different, are an arylene group or an aryl group and at least one of $Ar^1$ or $Ar^2$ is an arylene group. In an eighth embodiment, the functional group comprises an aryl or alkyl polyacid group comprising at least two carboxylic acid groups, preferably at least three carboxylic acid groups. Preferably, the organic group has a calcium index value greater than a calcium index value of phenylphosphonic acid and more preferably greater than a calcium index value of 1,2,3-benzene tricarboxylic acid.

The present invention further relates to a modified colorant as described herein that further comprises a second organic group that is different from the polymeric group. The second organic group may comprise at least one ionic group, at least one ionizable group, or a mixture thereof. Also, the second organic group may be a polymeric group.

The present invention further relates to inkjet ink composition comprising a) a liquid vehicle, b) at least one colorant, and c) at least one polymer comprising at least one functional group as described herein. The polymer may be as a separate additive or it may be either attached to or adsorbed on the colorant, such as a coating. The inkjet ink compositions may further comprise a second modified pigment comprising a pigment having attached a second organic group different from the organic group, such as at least one ionic group, at least one ionizable group, or a mixture thereof. The second organic group may also be a polymeric group.

DETAILED DESCRIPTION OF THE INVENTION

The present invention relates to modified colorants having attached or adsorbed polymers and to inkjet ink compositions comprising colorants and these polymers.

The modified colorant of the present invention comprises a colorant and a polymer. The polymer may be either a coating on the colorant or it may be attached to the colorant. The colorant may be any colorant known to one skilled in the art, such as a dye (which is a soluble colorant) or a pigment (which is an insoluble colorant). Preferably the colorant is an organic colorant or a carbonaceous pigment and is either a pigment or a disperse dye (which is soluble in a solvent but is water insoluble). Most preferred are pigments.

The dye may be any of those known in the art, particularly those to which at least one organic group may be attached. Thus, the dye can be selected from an acid dye, a basic dye, a direct dye, a disperse dye, or a reactive dye. Combinations of dyes may also be used in order to form different shades. Examples of acid dye include, but are not limited to, Acid Red 18, Acid Red 27, Acid Red 52, Acid Red 249, Acid Red 289, Acid Blue 9, Acid Yellow 23, Acid Yellow 17, Acid Yellow 23, and Acid Black 52. Examples of basic dyes include, but are not limited to, Basic Red 1, Basic Blue 3, and Basic Yellow 13. Examples of direct dyes include, but are not limited to, Direct Red 227, Direct Blue 86, Direct Blue 199, Direct Yellow 86, Direct Yellow 132, Direct Yellow 4, Direct Yellow 50, Direct Yellow 132, Direct Yellow 104, Direct Black 170, Direct Black 22, Direct Blue 199, Direct Black 19, and Direct Black 168. Examples of reactive dyes include, but are not limited to, Reactive Red 180, Reactive Red 31, Reactive Red 29, Reactive Red 23, Reactive Red 120, Reactive Blue 49, Reactive Blue 25, Reactive Yellow 37, Reactive Black 31, Reactive Black 8, Reactive Green 19, and Reactive Orange 84. Other types of dyes can also be used, including, for example, Yellow 104 and Magenta 377.

The pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 660, Regal® 330, Regal® 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). Examples of other suitable colored pigments are described in the Colour Index, 3rd edition (The Society of Dyers and Colourists, 1982). Preferably the pigment is a cyan pigment, such as Pigment Blue 15 or Pigment Blue 60, a magenta pigment, such as Pigment Red 122, Pigment Red 177, Pigment Red 185, Pigment Red 202, or Pigment Violet 19, a yellow pigment, such as Pigment Yellow 74, Pigment Yellow 128, Pigment Yellow 139, Pigment Yellow 155, Pigment Yellow 180, Pigment Yellow 185, Pigment Yellow 218, Pigment Yellow 220, or Pigment Yellow 221, an orange pigment, such as Pigment Orange 168, a green pigment, such as Pigment Green 7 or Pigment Green 36, or black pigment, such as carbon black.

The pigment can have a wide range of BET surface areas, as measured by nitrogen adsorption, depending on the desired properties of the pigment. Preferably, the pigments have a BET surface area between about 10 m$^2$/g and about 1500 m$^2$/g, more preferably between about 20 m$^2$/g and about 600 m$^2$/g. If the desired surface area is not readily available for the desired application, it is also well recognized by those skilled in the art that the pigment may be subjected to conventional size reduction or comminution techniques, such as ball or jet milling or sonication, to reduce the pigment to a smaller particle size, if desired. Also, the pigment can have a wide variety of primary particle sizes known in the art. For example, the pigment may have a primary particle size of between about 5 nm to about 100 nm, including about 10 nm to about 80 nm and 15 nm to about 50 nm. In addition, the pigment can also have a wide range of dibutylphthalate absorption (DBP) values, which is a measure of the structure or branching of the pigment. For example, the pigment may be a carbon black having a DBP value of from about 25 to 400 mL/100 g, including from about 30 to 200 mL/100 g and from about 50 to 150 mL/100 g. Also, the pigment may be an organic colored pigment having an oil adsorption value (as described in ISO 787 T5) of from about 5 to 150 mL/100 g, including from about 10 to 100 mL/100 g and from about 20 to 80 mL/100 g.

The pigment may also be a pigment that has been oxidized using an oxidizing agent in order to introduce ionic and/or ionizable groups onto the surface. Pigments prepared in this way have been found to have a higher degree of oxygen-containing groups on the surface. Oxidizing agents include, but are not limited to, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, pigments prepared using other surface modification methods to introduce ionic or ionizable groups onto a pigment surface, such as chlorination and sulfonylation, may also be used.

The colorant may also be a modified pigment comprising a pigment having attached at least one ionic group, ionizable group, or a mixture of an ionic group and an ionizable group. The pigment can be any of those described above. An ionic group is either anionic or cationic and is associated with a counterion of the opposite charge including inorganic or organic counterions such as $Na^+$, $K^+$, $Li^+$, $NH_4^+$, $NR'_4^+$, acetate, $NO_3^-$, $SO_4^{-2}$, $R''SO_3^-$, $R'OSO_3^-$, $OH^-$, and $Cl^-$, where R', which can be the same or different, represents hydrogen or an organic group such as a substituted or unsubstituted aryl and/or alkyl group. An ionizable group is one that is capable of forming an ionic group in the medium of use. An ionizable groups form anions and cationizable groups form cations. Preferably, the attached group is an organic group. Organic ionic groups include those described in U.S. Pat. No. 5,698,016, the description of which is fully incorporated herein by reference.

Anionic groups are negatively charged ionic groups that may be generated from groups having ionizable substituents that can form anions (anionizable groups), such as acidic substituents. They may also be the anion in the salts of ionizable substituents. Representative examples of anionic groups include —$COO^-$, —$SO_3^-$, —$OSO_3^-$, —$HPO_3^-$, —$OPO_3^{-2}$, and —$PO_3^{-2}$. Representative examples of anionizable groups include —COOH, —$SO_3H$, —$PO_3H_2$, —R'SH, —R'OH, and —$SO_2NHCOR'$, where R' represents hydrogen or an organic group such as a substituted or unsubstituted aryl and/or alkyl group. Preferably, the attached group comprises a carboxylic acid group, a sulfonic acid group, a sulfate group, or salts thereof. For example, the attached group may be an organic group such as a benzene carboxylic acid group (a —$C_6H_4$—COOH group), a benzene dicarboxylic acid group, a benzene tricarboxylic acid group, a benzene sulfonic acid group (a —$C_6H_4$—$SO_3H$ group), or salts thereof. The attached organic group may also be a substituted derivative of any of these. Also, the ionic or ionizable groups may be any of those described in more detail below relating to the functional group of the polymer.

Cationic groups are positively charged organic ionic groups that may be generated from ionizable substituents that can form cations (cationizable groups), such as protonated amines. For example, alkyl or aryl amines may be protonated to form ammonium groups —$NR'_2H^+$, where R' represent an organic group such as a substituted or unsubstituted aryl, alkyl, aralkyl, or alkaryl group. Cationic groups may also be positively charged organic ionic groups. Examples include quaternary ammonium groups (—$NR'_3^+$) and quaternary phosphonium groups (—$PR'_3^+$). Here, R' represents hydrogen or an organic group such as a substituted or unsubstituted aryl and/or alkyl group. Preferably, the attached group comprises an alkyl amine group or a salt thereof or an alkyl ammonium group.

As described above, it is preferred that the colorant is a pigment, and, therefore, the modified colorant is preferably a modified pigment. The modified pigment comprises the pigment and at least one polymer. In one embodiment, the modified pigment comprises the pigment coated by the polymer. In another embodiment, the modified pigment comprises the pigment having attached at least one polymeric group, wherein the polymeric group comprises the polymer. Thus, the modified pigment may be a pigment having an attached polymer. Preferably, for this embodiment, the polymeric group is directly attached.

For the modified pigments of the present invention comprising either an attached or adsorbed polymer, the polymer comprises at least one functional group. As used herein, the term "functional group" relating to the polymer refers to a pendant group off of the backbone of the polymer and does not relate to segments or groups that include more than one repeat unit of the monomer. In a first embodiment of the present invention, the functional group of the polymer comprises at least one phosphorus-containing group having at least one P—O or P=O bond, such as at least one phosphonic acid group, at least one phosphinic acid group, at least one phosphinous acid group, at least one phosphite group, at least one phosphate, diphosphate, triphosphate, or pyrophosphate group, partial esters thereof, or salts thereof. For example, the functional group comprises at least one phosphonic acid group, partial ester thereof, or salt thereof. Preferably the functional group comprises at least two of these groups, such as at least two phosphonic acid groups, partial esters thereof, or salts thereof. By "partial ester thereof" is meant that the phosphonic acid group may be a partial phosphonic acid ester group having the formula —$PO_3RH$, or a salt thereof, wherein R is an aryl, alkaryl, aralkyl, or alkyl group. When the functional group comprises at least two phosphonic acid groups or salts thereof, either or both of the phosphonic acid groups may be a partial phosphonic ester group. Also, one of the phosphonic acid groups may be a phosphonic acid ester having the formula —$PO_3R_2$ while the other phosphonic acid group may be either a partial phosphonic ester group, a phosphonic acid group, or a salt thereof. However, it is preferred that, for this embodiment, at least one of the phosphonic acid groups is either a phosphonic acid, a partial ester thereof, or salts thereof. By "salts thereof" is meant that the phosphonic acid group may be in a partially or fully ionized form having a cationic counterion. When the functional group comprises at least two phosphonic acid groups, either or both of the phosphonic acid groups may be in either a partially or fully ionized form. Thus, preferably the functional group comprises at least two phosphonic acid groups, wherein either or both may have the formula —$PO_3H_2$, —$PO_3H^-M^+$ (monobasic salt), or —$PO_3^{-2}M^+_2$ (dibasic salt), wherein $M^+$ is a cation such as $Na^+$, $K^+$, $Li^+$, or $NR_4^+$, wherein R, which can be the same or different, represents hydrogen or an organic group such as a substituted or unsubstituted aryl and/or alkyl group.

For this embodiment, the functional group may comprise at least one geminal bisphosphonic acid group, partial esters thereof, or salts thereof—that is, the functional group may comprise at least two phosphonic acid groups, partial esters thereof, or salts thereof that are directly bonded to the same carbon atom. Such a group may also be referred to as a 1,1-diphosphonic acid group, partial ester thereof, or salt thereof. Thus, for example, the functional group may comprise a group having the formula —$CQ(PO_3H_2)_2$, partial esters thereof, or salts thereof. Q is bonded to the geminal position and may be H, R, OR, SR, or $NR_2$ wherein R, which can be the same or different, is H, a C1-C18 saturated or unsaturated, branched or unbranched alkyl group, a C1-C18 saturated or unsaturated, branched or unbranched acyl group, an aralkyl group, an alkaryl group, or an aryl group. For example, Q may be H, R, OR, SR, or $NR_2$, wherein R, which can be the same or different, is H, a C1-C6 alkyl group, or an aryl group. Preferably Q is H, OH, or $NH_2$. Furthermore, the functional group may comprise a group having the formula —$(CH_2)_n$—$CQ(PO_3H_2)_2$, partial esters thereof, or salts thereof, wherein Q is as described above and n is 0 to 9, such as 1 to 9. Preferably n is 0 to 3, such as 1 to 3, and more preferably, n is either 0 or 1. Also, the functional group may comprise a group having the formula —X—$(CH_2)_n$—$CQ(PO_3H_2)_2$, partial esters thereof, or salts thereof, wherein Q and n are as described above and X is an arylene, heteroarylene, alkylene, vinylidene, alkarylene, aralkylene, cyclic, or heterocyclic group. For example, X may be an arylene group, such as a phenylene, naphthalene, or biphenylene group, which may be further substituted with any group, such as one or more alkyl groups or aryl groups. When X is an alkylene group, examples include, but are not limited to, substituted or unsubstituted alkylene groups, which may be branched or unbranched and can be substituted with one or more groups, such as aromatic groups. Examples include, but are not limited to, $C_1$-$C_{12}$ groups like methylene, ethylene, propylene, or butylene, groups.

X may be further substituted with one or more additional functional groups. Examples of additional functional groups include, but are not limited to, R', OR', COR', COOR', OCOR', carboxylates, halogens, CN, $NR'_2$, $SO_3H$, sulfonates, sulfates, NR'(COR'), $CONR'_2$, imides, $NO_2$, phosphates, phosphonates, N=NR', SOR', $NR'SO_2R'$, and $SO_2NR_2'$, wherein R' which can be the same or different, is independently hydrogen, branched or unbranched $C_1$-$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

In addition, the functional group may be comprise a group having the formula -Sp-$(CH_2)_n$—$CQ(PO_3H_2)_2$, partial esters thereof, or salt thereof, wherein Q and n are as described above. Sp is a spacer group, which, as used herein, is a link between two groups. Sp can be a bond or a chemical group. Examples of chemical groups include, but are not limited to, —$CO_2$—, —$O_2C$—, —CO—, —$OSO_2$—, —$SO_3$—, —$SO_2$—, —$SO_2C_2H_4O$—, —$SO_2C_2H_4S$—, —$SO_2C_2H_4NR''$—, —O—, —S—, —NR''—, —NR''CO—, —CONR"—, —NR"CO$_2$—, —O$_2$CNR"—, —NR"CONR"—, —N(COR")CO—, —CON(COR")—, —NR"COCH(CH$_2$CO$_2$R")— and cyclic imides therefrom, —NR"COCH$_2$CH(CO$_2$R")— and cyclic imides therefrom, —CH(CH$_2$CO$_2$R")CONR"— and cyclic imides therefrom, —CH(CO$_2$R")CH$_2$CONR" and cyclic imides therefrom, (including phthalimide and maleimides of these), sulfonamide groups (including —SO$_2$NR"— and —NR"SO$_2$— groups), arylene groups, alkylene groups and the like. R", which can be the same or different, represents hydrogen or an organic group such as a substituted or unsubstituted aryl or alkyl group. Preferably, Sp is —CO$_2$—, —O$_2$C—, —O—, —NR"—, —NR"CO— or —CONR"—, —SO$_2$NR"—, —SO$_2$CH$_2$CH$_2$NR"—, —SO$_2$CH$_2$CH$_2$O—, or —SO$_2$CH$_2$CH$_2$S— wherein R" is H or a C1-C6 alkyl group.

In addition, the functional group may comprise at least one group having the formula —N—[(CH$_2$)$_m$(PO$_3$H$_2$)]$_2$, partial esters thereof, or salts thereof, wherein m, which can be the same or different, is 1 to 9. Preferably m is 1 to 3 and more preferably is 1 or 2. For example, the functional group may comprise at least one group having the formula —(CH$_2$)$_n$—N—[(CH$_2$)$_m$(PO$_3$H$_2$)]$_2$, partial esters thereof, or salts thereof, wherein n is 0 to 9, such as 1 to 9, and is preferably 0 to 3, such as 1 to 3, and m is as defined above. Also, the functional group may comprise at least one group having the formula —X—(CH$_2$)$_n$—N—[(CH$_2$)$_m$(PO$_3$H$_2$)]$_2$, partial esters thereof, or salts thereof, wherein X, m, and n are as described above. Also, the functional group may comprise at least one group having the formula -Sp-(CH$_2$)$_n$—N—[(CH$_2$)$_m$(PO$_3$H$_2$)]$_2$, partial esters thereof, or salts thereof, wherein m, n, and Sp are as described above.

In addition, the functional group may comprise at least one group having the formula —CR=C(PO$_3$H$_2$)$_2$, partial esters thereof, or salts thereof. R can be H, a C1-C18 saturated or unsaturated, branched or unbranched alkyl group, a C1-C18 saturated or unsaturated, branched or unbranched acyl group, an aralkyl group, an alkaryl group, or an aryl group. Preferably, R is H, a C1-C6 alkyl group, or an aryl group.

For this embodiment, the functional group may comprise more than two phosphonic acid groups, partial esters thereof, or salts thereof and may, for example, comprise more than one type of group (such as two or more) in which each type of group comprises at least two phosphonic acid groups, partial esters thereof, or salts thereof. For example, the functional group may comprise a group having the formula —X—[CQ(PO$_3$H$_2$)$_2$]$_p$, partial esters thereof, or salt thereof. X and Q are as described above, and preferably X is an arylene, heteroarylene, alkylene, alkarylene, or aralkylene group. In this formula, p is 1 to 4 and is preferably 2.

In addition, the functional group may comprise at least one vicinal bisphosphonic acid group, partial ester thereof, or salts thereof, meaning that these groups are adjacent to each other. Thus, the functional group may comprise two phosphonic acid groups, partial esters thereof, or salts thereof bonded to adjacent or neighboring carbon atoms. Such groups are also sometimes referred to as 1,2-diphosphonic acid groups, partial esters thereof, or salts thereof. The group comprising the two phosphonic acid groups, partial esters thereof, or salts thereof may be an aromatic group or an alkyl group, and therefore the vicinal bisphosphonic acid group may be a vicinal alkyl or a vicinal aryl diphosphonic acid group, partial ester thereof, or salts thereof. For example, the functional group may be a group having the formula —C$_6$H$_3$—(PO$_3$H$_2$)$_2$, partial esters thereof, or salts thereof, wherein the acid, ester, or salt groups are in positions ortho to each other.

In a second embodiment of the present invention, the functional group comprises at least one hydroxamic acid group or salt thereof. Thus, the functional group may comprise at least one group having the formula —N(OH)—CO— or a salt thereof. Such groups include, for example, amide or imide groups in which the amide or imide nitrogen is substituted with an OH group, and tautomers thereof. The hydroxamic acid group may be acyclic, in which the N—C bond is part of a non-cyclic group, or cyclic, in which the N—C bond is part of a cyclic group. Preferably, the cyclic hydroxamic acid group is a heterocyclic group, and more preferably a heteroaryl group, such as a hydroxy pyridonyl group (which may also be referred to as a hydroxy pyridinyl N-oxide group) or a hydroxy quinolonyl group (which may also be referred to as a hydroxy quinolinyl N-oxide group). Specific examples include a 1-hydroxy-2-pyridonyl group, a 1-hydroxy-2-quinolonyl group, or salts thereof. One skilled in the art would recognize that isomers and tautomers of these can also be used. In addition, the functional group may further comprise additional functional groups, including those described above, such as those for X.

In a third embodiment of the present invention, the functional group comprises at least one heteroaryl group having at least one OH group, or salts thereof. Preferably the heteroaryl group is a nitrogen-containing heteroaryl group, such as a pyridinyl group or a quinolinyl group, and the functional group is a hydroxy pyridinyl group or a hydroxy quinolinyl group. The hydroxy group is preferably at a position on the heteroaryl group such that it is geometrically close to the heteroatom, such as ortho to the heteroatom. Such a group may be in the salt form. For example, the functional group may comprise a 2-hydroxy pyridinyl group or a 2-hydroxy-quinolinyl group, as well as an 8-hydroxy-quinolinyl group or salts thereof. Other isomers or tautomers will also be known to one skilled in the art. Preferably the functional group comprises an 8-hydroxy-quinolinyl group. In addition, the functional group may further comprise additional functional groups, including those described above for X. For example, electron withdrawing groups, such as chloro or nitro groups, may be included in order to lower the pKa of the OH group.

For this embodiment, the functional group may also comprise at least one heteroaryl group having at least two OH groups. When there are two OH groups, preferably the OH groups are in positions ortho to each other on the heteroaryl group. When there are more than two OH groups, it is preferred that at least two of the OH groups are in positions ortho to each other on the heteroaryl group. For example, the functional group may be a dihydroxy-pyridinyl group, such as a 2,3-dihydroxy-pyridinyl group (which can also be referred to as a 3-hydroxy-2-pyridonyl group), a 3,4-dihydroxy-pyridinyl group (which can also be referred to as a 3-hydroxy-4-pyridonyl group), a 2,3-dihydroxy-quinolinyl group (which can also be referred to as 3-hydroxy-2-quinolonyl group), or a 3,4-dihydroxy-quinolinyl group (which can also be referred to as a 3-hydroxy-4 quinolonyl group). Other isomers and tautomers will also be known to one skilled in the art.

In a fourth embodiment of the present invention, the functional group comprises at least one phosphonic acid group, partial ester thereof, or salts thereof and at least one second ionic or ionizable group. The second group is not a phosphonic acid group or salt thereof. Preferably, the second ionic or ionizable group is a carboxylic acid group, a sulfonic acid group, or a salt thereof. Preferably the basic group is a Lewis base, such as an OH group (a hydroxyl group) or an amino group. Preferably these two groups are geminal to each other, by which is meant, are directly bonded to the same carbon atom. Thus, for example, when the second ionic or ionizable group is a carboxylic acid group or salt thereof, the functional group may comprise a group having the formula —CQ($PO_3H_2$)($CO_2H$) or salts thereof. Q, which is bonded to the geminal position, may be any of those described above. Preferably, Q is H. In addition, the functional group may comprise a group having the formula —($CH_2$)$_n$—CQ($PO_3H_2$)($CO_2H$) or salts thereof, wherein n is 0 to 9 and is preferably 0 to 3. Furthermore, the functional group may comprise a group having the formula —X—($CH_2$)$_n$—CQ($PO_3H_2$)($CO_2H$) or salt thereof, wherein X is as described above. For example, X may be an arylene group. Also, the functional group may comprise a group having the formula -Sp-($CH_2$)$_n$—CQ($PO_3H_2$)($CO_2H$) or salt thereof, wherein Sp, which is a spacer group, are as described above.

As a further example for this embodiment, the functional group may comprise at least one phosphonic acid group, a partial ester thereof, or salts thereof and at least one hydroxy group or salt thereof, such as a group having the formula —X—($PO_3H_2$)(OH) or salts thereof, wherein X is as described above. Preferably, X is an arylene group, and for this preferred formula, the phosphonic acid group and hydroxy group are in positions ortho to each other. When these groups are geminal, the organic group may comprise at least one group having the formula —CR($PO_3H_2$)(OH) or salts thereof, wherein R is H or a C1-C6 alkyl group. Preferably, R is H. Also, the functional group may comprise at least one group having the formula —($CH_2$)$_n$—CR($PO_3H_2$)(OH) or salts thereof, wherein n is 0 to 9 and is preferably 0 to 3. Furthermore, the functional group may comprise a group having the formulas —X—($CH_2$)$_n$—CR($PO_3H_2$)(OH) or salts thereof or -Sp-($CH_2$)$_n$—CR($PO_3H_2$)(OH) or salts thereof, wherein Sp are as described above.

In a fifth embodiment of the present invention, the functional group comprises a heteroaryl group having at least one carboxylic acid group or salt thereof. While the heteroaryl group may be any of those known in the art, preferably the heteroaryl group is a nitrogen containing heteroaryl group, such as a pyridinyl group, a pyrimidinyl group, a pyrrolyl group, a quinolinyl group, or a pyrazinyl group. Preferably the functional group comprises two carboxylic acid groups or salts thereof. These acid groups may be anywhere on the heteroaryl ring but are preferably either ortho or meta to each other. Furthermore, when the heteroaryl group contains at least one nitrogen atom, it is preferred that the two acid groups are both adjacent to (that is, ortho to) the nitrogen atom. Thus, for example, the heteroaryl group may be a 2,6-pyridinyl-dicarboxylic acid group.

In a sixth embodiment of the present invention, the functional comprises an aryl group having at least one nitroso group and at least one OH group, or a salt thereof. The two groups may be located anywhere on the aryl group. Preferably, the aryl group is a phenyl group and the nitroso and OH groups are in positions ortho to each other. The aryl group may further comprise other substituents, such as alkyl groups, halogen groups, ether groups and the like, including electron withdrawing groups, such as chloro and nitro groups, capable of lowering the pKa of the organic group, regardless of which tautomeric form it is in. For example, the functional group can be a nitrosophenolic group, such as a group having the formula —$C_6H_3$(OH)(NO) or, preferably a group having the formula —$C_6H_2$Z(OH)(NO), wherein Z is an electron withdrawing group such as chloro or nitro.

In a seventh embodiment of the present invention, the functional group comprises an azoarene group. For example, the functional group may comprise a group having the formula $Ar^1$—N=N—$Ar^2$, wherein $Ar^1$ and $Ar^2$, which can be the same or different, are an arylene group, such as a phenylene or a naphthylene group, or an aryl group, such as a phenyl group or a naphthyl group, and at least one of $Ar^1$ or $Ar^2$ is an arylene group. For this embodiment, the azoarene group has at least one and preferably at least two OH groups, at least one and preferably at least two $NH_2$ groups, or at least one OH group and at least one $NH_2$ group. Thus, for example, the azoarene group may have the formula —(HO)$Ar^1$—N=N—$Ar^2$(OH) (a bis-hydroxy azoarene group), —($H_2$N)$Ar^1$—N=N—$Ar^2$($NH_2$) (a bis-amino azoarene group), or —(HO)$Ar^1$—N=N—$Ar^2$($NH_2$) or —($H_2$N)$Ar^1$—N=N—$Ar^2$(OH) (an amino-hydroxy azoarene group). Other combinations may also be possible. Preferably, the OH and/or $NH_2$ groups are located at positions ortho to the azo group (the N=N group). For example, the functional group may be a group having the structure —(HO)$C_6H_3$—N=N—$C_6H_4$(OH). Also, electron withdrawing groups, such as chloro or nitro groups, may be included on the aryl and/or arylene groups. Thus, preferably, the organic group is a group having the structure —(HO)$C_6H_3$—N=N—$C_6H_3$Z(OH), wherein Z is an electron withdrawing group such as chloro or nitro.

In an eighth embodiment of the present invention, the functional group comprises an aryl or alkyl polyacid group comprising at least two carboxylic acid groups, preferably at least three carboxylic acid groups. For example, the functional group may be an alkyl poly-acid group having at least two acid groups, at least three, four, or more acid groups, such as at least two carboxylic acid groups, at least three or more carboxylic groups, as well as other types of acid groups in addition or in the alternative. For example, the functional group may comprise two carboxylic acid groups and at least one ether or amino group. Specific examples of functional groups include —CH($CO_2H$)$CH_2OC_2H_4CO_2H$, —CH($CH_2CO_2H$)$OC_2H_4CO_2H$, —CH($CH_2OC_2H_4CO_2H$)($OC_2H_4CO_2H$), and —CH($CO_2H$)N($CH_2CO_2H$)$_2$. The functional group may also comprise an aryl polyacid group. This group comprises at least two carboxylic acid groups. Preferably, the carboxylic acid groups are vicinal to each other. Thus, the aryl polyacid group can be substituted with at least one group that comprises two adjacent carboxylic acid groups (i.e., carboxylic acid groups bonded to adjacent or neighboring carbon atoms), sometimes also referred to as a vicinal dicarboxylic acid or a 1,2-dicarboxylic acid. Thus, the aryl polyacid group may comprise a group having three or more carboxylic acid groups, wherein at least two of the carboxylic acid groups are adjacent to each other, forming a vicinal dicarboxylic acid group. For example, the aromatic amine may comprise a 1,2,3- or 1,2,4-tricarboxylic acid group, such as a —$C_6H_2$—(COOH)$_3$ group, or may comprise a 1,2,3,4- or 1,2,4,5-tetra carboxylic acid group, such as a —$C_6H$—(COOH)$_4$ group. Other substitution patterns are also possible and will be known to one skilled in the art.

For each of these embodiments, the amount of functional groups can be varied, depending on the desired use of the modified colorant and the type of attached group. Also, the amount of polymeric group, comprising the polymer, may also be varied. For example, the total amount of polymer group may be from about 1-80% by weight of the modified colorant, preferably 5-60%, and more preferably 10-40% by weight polymer. The amount of attached polymer can be determined using any method known in the art. Additional attached organic groups, which differ from those described for the various embodiments of the present invention, may also be present and are described in more detail below.

The modified colorant and, in particular, the modified pigment may be either in a solid form, such as a powder or a paste, or in a dispersion form. For example, the modified pigment may be produced in the form of a dispersion, and isolated from the dispersion in the form of a solid, such as by spray drying. Alternatively, a solid form of the modified pigment may be produced directly. Preferably the modified pigment is in the form of a dispersion. The modified pigment dispersion may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art.

The modified pigment may also be dispersed into a liquid medium, and the resulting dispersions may be purified or classified to remove impurities and other undesirable free species that can co-exist in the dispersion as a result of the manufacturing process. For example, the dispersion can be purified to remove any undesired free species, such as unreacted treating agent using known techniques such as ultrafiltration/diafiltration, reverse osmosis, or ion exchange. Preferably, the large particle concentration of the dispersion is also reduced in order to improve the overall dispersion stability. Thus, for example, particles having a size greater than 500 nm can be removed using techniques such as centrifugation.

It is preferred that the functional group of the polymer be a group that has a high calcium index value. As used herein, the term "calcium index value" refers to a measure of the ability of a functional group to coordinate or bind calcium ions in solution. The higher the calcium index value, the more strongly or effectively the group can coordinate calcium ions. Such a value can be determined using any method known in the art. For example, the calcium index value may be measured using a method in which the amount of calcium coordinated by a compound in a standard solution containing soluble calcium ions and a color indicator is measured using UV-Vis spectroscopy. In addition, for compounds having a strong color, the calcium index value may be measured using an NMR method. Also, for some compounds, values measured using known literature techniques can be used. Details relating to specific methods are described below.

As used herein, the term "high" in reference to the calcium index value means that the value is greater than that of a reference material. For the purposes of the present invention, the reference is phenylphosphonic acid. Alkyl phosphonic acids, such as ethyl or isopropyl phosphonic acid, would be expected to have a calcium index value slightly higher than that of phenylphosphonic acid. Therefore, preferably the reference has a calcium index value greater than these. More preferably, the reference is 1,2,3-benzene tricarboxylic acid. Thus, the functional group of the polymer attached to the pigment has a calcium index value that is greater than the calcium index value of phenyl phosphonic acid and more preferably has a calcium index value greater than or equal to that of 1,2,3-benzene tricarboxylic acid. Preferably, the functional group has a calcium index value greater than or equal to 2.8, more preferably greater than 3.0, and most preferably greater than 3.2, determined using UV-Vis spectroscopy, as described in more detail below. Surprisingly it has been found that modified colorants and, in particular, modified pigments comprising pigments having attached polymeric groups described herein, particularly those comprising functional groups having a calcium index value greater than that of phenylphosphonic acid and more preferably greater than or equal to that of 1,2,3-benzene tricarboxylic acid, have improved properties, especially when used in an inkjet ink composition, compared to other attached groups, particularly those that have a calcium index value that is less than these reference compounds. For modified pigments coated by the polymer, the functional group preferably has a calcium index value greater than or equal to that of 1,2,3-benzene tricarboxylic acid.

The polymers having the functional groups described above can be a homopolymer, copolymer, terpolymer, and/or a polymer containing any number of different repeating units. Further, the polymer can be a random polymer, branched polymer, alternating polymer, graft polymer, block polymer, star-like polymer, and/or comb-like polymer. The type of polymer can be varied depending on the intended application. For example, the polymeric group comprises a polymer comprising acid groups and having an acid number of less than 200, such as less than 150, or less than 100, or less than 50. Acid numbers can be determined using any method known in the art, including titration with a strong base such as KOH. Specific examples include acid numbers between 100 and 200, between 50 and 100, and between 0 and 50. Also, the polymer may have a Tg less than 100, such as between 50 and 100, and preferably less than 50. Furthermore, the polymer may have a molecular weight (Mw) of between about 500-100,000 such as between about 1000 and 50,000 and between about 2,000 and 25,000. The polydispersity of the polymer of the polymeric group is generally less than 3, such as less than 2.5, and less than 2. Alternatively, the molecular weight distribution may be polymodal, such as bimodal. As noted above, the polymeric group attached to the modified pigment of the present invention may comprise any of these polymers or a combination of polymers.

The polymer having the functional groups described above may be prepared using any method known in the art. For example, the polymer can be prepared using a variety of different polymerization techniques that include the use of at least one monomer comprising the functional group. Preferably the polymer is prepared by the polymerization of a radically polymerizable monomer comprising at least one of the groups described above. For example, the monomer may be vinylphosphonic acid, partial esters thereof, or salts thereof or vinylidene diphosphonic acid, partial esters thereof, or salts thereof. Preferably, the salts are those that enable the monomer to be at least partially soluble in an organic solvent. For example, the monomer may be a tetraalkyl ammonium salt, such as a tetraethyl or tetrabutyl ammonium salt. Mixed salts and partial salts, such as combinations of the acid form with sodium and/or alkyl ammonium salts, can also be used. The monomers may also be an acrylamide, a methacrylamide, an acrylate ester, a methacrylate ester, a vinyl ester, a vinyl ether, or a styrene monomer that comprises at least one of the groups described above. Specific examples include acrylamides (and methacrylamides) prepared by the reaction of acryloyl chloride or acrylic acid, or esters thereof, such as methyl acrylate (or methacryloyl chloride and methacrylic acid or esters thereof), amine compounds comprising the functional groups described above, such as alkylamines comprising at least one bisphosphonate group, and styrene derivatives such as [2-(4-vinylphenyl)ethane-1,1-diyl]bisphosphonic acid, [hydroxy(4-vinylphenyl)methylene]bisphosphonic acid, and {1-hydroxy-4-[4-vinylbenzoyl)amino]butane-1,1-diyl}bisphosphonic acid. Specific acrylamides and methacrylamides include 4-methacrylamido-(1,2-benzenedicarboxylic acid), 4-acrylamido-(1,2-benzenedicarboxylic acid), 5-methacrylamido-(1,2,3-benzenetricarboxylic acid), 5-acrylamido-(1,2,3-benzenetricarboxylic acid), 5-methacrylamido-(1,2,4-benzenetricarboxylic acid), 5-acrylamido-(1,2,4-benzenetricarboxylic acid), 5-methacrylamido-2-hydroxypyridine-N-oxide, 6-methacrylamido-2-hydroxyquinoline-N-oxide, and 4-methacrylamido-1-hydroxybutane-1,1-diphosphonic acid.

The polymer can also be prepared by the polymerization of at least one of the monomers described above and one or more additional monomers not comprising one of the groups described above. Such monomers may provide the polymer with additional desirable properties, particularly useful in an inkjet ink composition. Examples include, but are not limited to, acrylic and methacrylic acid, acrylate esters, methacrylate esters, acrylamides and methacrylamides, acrylonitriles, cyanoacrylate esters, maleate and fumarate diesters, vinyl pyridines, vinyl N-alkylpyrroles, vinyl acetate, vinyl oxazoles, vinyl thiazoles, vinyl pyrimidines, vinyl imidazoles, vinyl ketones, vinyl ethers, and styrenes. Vinyl ethers include those that can be prepared by cationic polymerization, such as those having the general structure $CH_2=CH(OR)$, wherein R is an alkyl, aralkyl, alkaryl, or aryl group or is a group comprising one or more alkylene oxide groups. Vinyl ketones include those in which the β-carbon atom of the alkyl group does not bear a hydrogen atom, such as vinyl ketones in which both β-carbons bear a C1-C4 alkyl group, halogen, etc. or a vinyl phenyl ketone in which the phenyl group may be substituted with from 1 to 5 C1-C6 alkyl groups and/or halogen atoms. Styrenes include those in which the vinyl group is substituted with a C1-C6 alkyl group, such as at the α-carbon atom, and/or those in which the phenyl group is substituted with from 1 to 5 substituents including a C1-C6 alkyl, alkenyl (including vinyl), or alkynyl (including acetylenyl) group, a phenyl group, a haloalkyl group, and functional groups such as C1-C6 alkoxy, halogen, nitro, carboxy, sulfonate, C1-C6 alkoxycarbonyl, hydroxy (including those protected with a C1-C6 acyl group), and cyano groups. Specific examples include methyl acrylate (MA), methyl methacrylate (MMA), ethyl acrylate (EA), ethyl methacrylate (EMA), butyl acrylate (BA), 2-ethylhexyl acrylate (EHA), acrylonitrile (AN), methacrylonitrile, styrene, and derivatives thereof.

The polymer can be prepared by the cationic or anionic polymerization of one or more polymerizable monomers. For example, polyvinyl ethers can be prepared by cationic polymerization of monomers, such as those having the general structure $CH_2=CH(OR)$, wherein R is an alkyl, aralkyl, alkaryl, or aryl group or is a group comprising one or more alkylene oxide groups. Other cationically or anionically polymerizable monomers can also be included.

The polymer can also be prepared by polycondensation techniques. For example, the polymer may be a polyester or a polyurethane having a functional group described above. For polyurethanes, examples of suitable methods include a solution method which comprises preparing an isocyanate-terminated prepolymer in a low boiling solvent (such as acetone) unreactive with an isocyanate group, introducing a hydrophilic group such as diamine or polyol therein, effecting phase change by diluting with water, and distilling off a solvent to obtain a polyurethane dispersion. Another suitable method comprises preparing an isocyanate group-terminated prepolymer having a hydrophilic group introduced, dispersing in water, and extending a chain with an amine.

Particularly, a polyurethane may be prepared by the prepolymer method, and a polyhydroxy compound having a low molecular weight may be used at that time. Examples of the polyhydroxy compound having a low molecular weight include the above illustrated starting materials of the polyester diol, such as glycol and alkylene oxide-low mol adduct, a trihydric alcohol such as glycerin, trimethylolethane or trimethylolpropane, its alkylene oxide-low mol adduct, and the like.

For water dispersible polyurethanes, it is generally known to use a method which comprises effecting phase change of a urethane polymer prepared in an organic solvent phase and emulsifying to further extend a chain in an aqueous phase. It is usual to use polyamines such as diamine as a chain extender at that time. For example, the urethane prepolymer is subjected to neutralization of an acid group derived from dimethylolalkanoic acid and chain extension with water or di- or triamine after or while neutralizing. Examples of the polyamines used as a chain extender in the amine extension include generally diamine or triamine. Their particular examples include hexamethylenediamine, isophoronediamine, hydrazine, piperazine and the like.

The polymers comprising the functional groups described above may also be prepared by reacting a reagent that comprises the desired functional group and a reactive group of the polymer. For example, the reagent may be an amine reagent comprising the desired functional group and the polymer may comprise a carboxylic acid or ester group as the reactive group. Other reactive groups may include acid anhydrides, acid halides, activated esters such as nitrophenyl esters or the reaction product of a carboxylic acid and N-hydroxysuccinimide, isocyanates, epoxides, thioepoxides, and aziridines. This reaction can be driven by heating or thermal dehydration. Alternatively, coupling agents such as carbodiimides may be used, for example, to react a carboxylic acid with an amine. Mixed anhydrides may also be used. These can react in order to form a polymer having the desired functional group. In addition, the polymer may be prepared by reacting a reagent having the functional group, a polymer having at least one reactive group, and at least one linking reagent. The linking reagent is one that is capable of reacting with both the reagent and the reactive group. For example, the reagent may be an amine reagent and the reactive group may comprise an amino group. In this case, the linking agent could be a dicarboxylic acid compound, an anhydride, a bis-epoxide, or a polyfunctional aziridine. Furthermore, the polymer may be prepared by direct conversion of carboxylic acids or derivatives thereof (such as halides, esters, amides, or nitriles), such as by phosphonylation. In these ways, a variety of polymers may be converted to polymers described herein by reacting or attached the specified functional group to the polymer backbone.

Modified pigments having attached polymeric groups of the present invention may be prepared using any method known in the art. Preferably the polymeric group is directly attached. Such modified pigments may be prepared using any method known to those skilled in the art such that organic chemical groups are attached to the pigment. For example, the polymer modified pigments may be prepared by the reaction of a functional group of a polymer with a functional group of a pigment (as shown in, for example, U.S. Pat. No. 6,723,783 or European Patent No. 0 272 127), including the reaction of an end or terminal functional polymer and a pigment. Other methods for preparing the modified pigments by reacting a pigment having available functional groups with a polymer comprising the functional group include those described in, for example, U.S. Pat. No. 6,723,783, which is incorporated in its entirety by reference herein. Such functional pigments may be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference. Such methods provide for a more stable attachment of the groups onto the pigment compared to dispersant type methods, which use, for example, polymers and/or surfactants. Alternatively, these modified pigments can be prepared by the reaction of an amine-containing functional group of a polymer with a diazotizing agent which is then further reacted with a pigment (as shown in, for example, U.S. Pat. No. 6,478,863), which may also utilize the methods described in the references above. In addition modified carbon blacks containing attached polymeric groups may also be prepared from pigments prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, Polym. Sci., 17, 417, 1992, each of which is also incorporated in their entirety by reference herein.

Furthermore, the polymer modified pigments may also be prepared by polymerization of monomers from a pigment. For example, the polymer modified pigments may be prepared by radical polymerization, controlled polymerization methods, such as atom transfer radical polymerization (ATRP), stable free radical (SFR) polymerization, and reversible addition-fragmentation chain transfer polymerization (RAFT), ionic polymerizations (anionic or cationic) such as group transfer polymerization (GTP), and condensation polymerization. Also, the polymer modified pigments may be prepared using the methods described in, for example, U.S. Pat. Nos. 6,372,820; 6,350,519; 6,551,393; or 6,368,239 or in International Patent Publication Nos. 2006/086599 and 2006/086660, which are incorporated in their entirety by reference herein. For modified pigments comprising the pigment coated by the polymer, these modified pigments can be prepared using any method known in the art, such as those described in U.S. Pat. Nos. 5,085,698, 5,998,501, 6,074,467, 6,852,777, and 7,074,843, and International Patent Publication Nos. WO 2004/111,140, WO 2005/061087, and WO 2006/064193, each incorporated in their entirety by reference herein.

The modified colorants of the present invention, particularly the modified pigments comprising a pigment having attached at least one polymeric group, may further comprise a second organic group, which is different from the polymeric groups described above. These include, for example, the groups described in U.S. Pat. No. 5,630,868, which is incorporated in its entirety by reference herein. For example, the modified pigment may further comprise a second attached organic group that may comprise at least one ionic group, at least one ionizable group, or a mixture thereof. Preferably the ionic or ionizable group is an anionic or anionizable group. Any of the ionic or ionizable groups, particularly the anionic or anionizable groups, described above regarding the pigment of the modified pigment of the present invention may be the second organic group. Furthermore, the second organic group may be a polymeric group comprising a polymer. Any of the polymeric groups described above can also be used as the second attached organic group.

The modified colorants of the present invention may be used in a variety of applications, including, for example, plastic compositions, aqueous or non-aqueous inks, aqueous or non-aqueous coatings, rubber compositions, paper compositions and textile compositions. In particular, these pigments may be used in aqueous compositions, including, for example, automotive and industrial coatings, paints, toners, adhesives, latexes, and inks. The pigments have been found to be most useful in ink compositions, especially inkjet inks.

Thus, the present invention further relates to an inkjet ink composition comprising a vehicle, a colorant, and a polymer. The polymer can be any of those described above. Thus, for example, the inkjet ink composition of the present invention can comprise a polymer having any of the functional groups described above and is either a separate additive in the composition or may be associated with the colorant, such as a modified colorant of the present invention having the polymer either attached or adsorbed thereto. Preferably the colorant is a pigment. The vehicle can be either an aqueous or non-aqueous liquid vehicle, but is preferably a vehicle that contains water. Thus, the vehicle is preferably an aqueous vehicle, and the inkjet ink composition is an aqueous inkjet ink composition. More preferably the vehicle contains greater than 50% water and includes, for example, water or mixtures of water with water miscible solvents such as alcohols.

The colorant can be any of the colorants described above and is preferably a modified pigment, as discussed above. The colorant is present in the inkjet ink composition in an amount effective to provide the desired image quality (for example, optical density) without detrimentally affecting the performance of the inkjet ink. Typically, the colorant is present in an amount ranging from about 0.1% to about 30% based on the weight of the ink. More or less colorant may be used depending on a variety of factors. For example, for the inkjet ink composition comprising the modified pigments of the present invention, the amount of pigment may vary depending on the amount of attached polymeric group. Also, the amount of polymer will vary depending on the type of colorant. Typically the ratio of polymer to pigment is between about 4:1 and 1:100, including between about 1:1 and about 1:5.

It is also within the bounds of the present invention to use a mixture of colorants, including, for example, a mixture of the various modified pigments described herein, or mixtures of these modified pigments and unmodified pigments, such as oxidized pigments, including self-dispersible oxidized pigments prepared using peroxide, ozone, persulfate, and hypohalites (some of which are commercially available from Rohm and Haas or Orient), other modified pigments, or both. Also, mixtures of modified colorants wherein one colorant comprises a dye and one colorant comprises a pigment may also be used.

For example, the inkjet ink composition of the present invention may comprises a liquid vehicle, a first modified pigment, which is a modified pigment of the present invention as described above, and a second modified pigment comprising a second pigment having attached at least one second organic group, which is different from the organic group of the first modified pigment. The pigment and the second pigment may be the same or different, depending, for example, if the blends of pigments are to create a specific target color or if the blend of pigments is to provide the same color using different types of modified pigments. The second organic group can be a group comprising at least one ionic group, at least one ionizable group, or a mixture thereof. Any of the ionic or ionizable groups described above relating to a second attached organic group of the modified pigment can be used here.

Also, the inkjet ink composition of the present invention may comprise a liquid vehicle, a first modified pigment, which is a modified pigment of the present invention as described above, and a second modified pigment comprising a second pigment having at least one attached or adsorbed polymer. Any of the polymers described above relating to the modified pigment of the present invention may also be used here. For example, the second modified pigment may be a polymer coated pigment, such as a polymer encapsulated pigment, comprising a pigment and at least one adsorbed polymer. Also, the second modified pigment may comprise a pigment having at least one attached polymeric group, wherein the polymeric group comprises the polymer.

The inkjet ink composition of the present invention can be formed with a minimum of additional components (additives and/or cosolvents) and processing steps. However, suitable additives may be incorporated in order to impart a number of desired properties while maintaining the stability of the compositions. For example, surfactants and/or dispersants, humectants, drying accelerators, penetrants, biocides, binders, and pH control agents, as well as other additives known in the art, may be added. The amount of a particular additive will vary depending on a variety of factors but generally ranges between 0% and 40%.

Dispersing agents (surfactants and/or dispersants) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be in solid form or as a water solution.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkyl sulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Specific examples include, but are not limited to, commercial products such as Versa® 4, Versa® 7, and Versa® 77 (National Starch and Chemical Co.); Lomar® D (Diamond Shamrock Chemicals Co.); Daxad®19 and Daxad® K (W. R. Grace Co.); and Tamol® SN (Rohm & Haas). Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols (such as Surfynol® 420, Surfynol® 440, and Surfynol® 465, available from Air Products), polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated mono-alkyl or dialkyl phenols may be used, such as Igepal® CA and CO series materials (Rhone-Poulenc Co.), Brij® Series materials (ICI Americas, Inc.), and Triton® series materials (Union Carbide Company). These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, such as Elvanols from DuPont, Celvoline from Celanese, polyvinylpyrrolidones such as Luvatec from BASF, Kollidon and Plasdone from ISP, and PVP-K, Glide, acrylic or methacrylic resins (often written as "(meth) acrylic") such as poly(meth)acrylic acid, Ethacryl line from Lyondell, Alcosperse from Alco, acrylic acid-(meth)acrylonitrile copolymers, potassium (meth)acrylate-(meth)acrylonitrile copolymers, vinyl acetate-(meth)acrylate ester copolymers and (meth)acrylic acid-(meth)acrylate ester copolymers; styrene-acrylic or methacrylic resins such as styrene-(meth)acrylic acid copolymers, such as the Joncryl line from BASF, Carbomers from Noveon, styrene-(meth)acrylic acid-(meth)acrylate ester copolymers, such as the Joncryl polymers from BASF, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, such as the SMA polymers from Sartomer, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof. Polymers, such as those listed above, variations and related materials, that can be used for dispersants and additives in inkjet inks are included in the Tego products from Degussa, the Ethacryl products from Lyondell, the Joncryl polymers from BASF, the EFKA dispersants from Ciba, and the Disperbyk and Byk dispersants from BYK Chemie.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

Various polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols (Elvanols from DuPont, Celvoline from Celanese), hydroxypropylenecellulose, hydroxyethylcellulose, polyvinylpyrrolidinone (such as Luvatec from BASF, Kollidon and Plasdone from ISP, and PVP-K, Glide), polyvinylether, starch, polysaccharides, polyethyleneimines with or without being derivatized with ethylene oxide and propylene oxide including the Discole® series (DKS International); the Jeffamine® series (Huntsman); and the like. Additional examples of water-soluble polymer compounds include various dispersants or surfactants described above, including, for example, styrene-acrylic acid copolymers (such as the Joncryl line from BASF, Carbomers from Noveon), styrene-acrylic acid-alkyl acrylate terpolymers, styrene-methacrylic acid copolymers (such as the Joncryl line from BASF), styrene-maleic acid copolymers (such as the SMA polymers from Sartomer), styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers (such as NeoCryl materials from NSM Neoresins, the AC and AS polymers from Alberdingk-Boley) or may be a water dispersible polyurethane (such as ABU from Alberdingk-Boley) or polyester (such as AQ polymers from Eastman Chemical). Polymers, such as those listed above, variations and related materials, that can be used for binders in inkjet inks are included in the Ethacryl products from Lyondell, the Joncryl polymers from BASF, the NeoCryl materials from NSM Neoresins, and the AC and AS polymers Alberdingk-Boley.

Various additives for controlling or regulating the pH of the inkjet ink composition of the present invention may also be used. Examples of suitable pH regulators include various amines such as diethanolamine and triethanolamine as well as various hydroxide reagents. An hydroxide reagent is any reagent that comprises an OH⁻ ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH⁻ ions in an aqueous medium. Examples include carbonates such as sodium carbonate, bicarbonates such as sodium bicarbonate, and alkoxides such as sodium methoxide and sodium ethoxide. Buffers may also be added.

Additionally, the inkjet ink composition of the present invention may further incorporate conventional dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink composition can be purified and/or classified using methods such as those described above for the modified pigments of the present invention. An optional counterion exchange step can also be used. Thus, unwanted impurities or undesirable large particles can be removed to produce an ink with good overall properties.

It has surprisingly been found that inkjet ink compositions comprising polymers having the functional groups described above and, in particular, comprising the modified colorants, preferably the modified pigments of the present invention, have improved overall properties compared to previously described inkjet ink compositions. While not wishing to be bound by theory, it is believed that the polymers having the described functional groups, particularly those with a calcium index value as set forth above, when incorporated into the inkjet ink compositions described above as either a separate additive or associated (attached or coated on) the colorant, produce stable dispersions that rapidly destabilize when in contact with a substrate, such as paper. The destabilization may be a result of an interaction or binding with calcium salts or other divalent metal salts present in the substrate or whether subsequently added, such as by printing with a fixer fluid containing metal salts. Alternatively, or in addition, destabilization may result from a change in pH on contact with the substrate, which may be particularly advantageous for modified pigments having the attached polymeric groups described above. It is believed that the rapid destabilization after printing, caused either by a change in pH, interaction with calcium, or both, results in printed images with good overall properties, such as optical density, edge acuity, and/or intercolor bleed. Furthermore the polymer has been found to improve the durability performance of printed images, including smear resistance, waterfastness, and/or rub resistance, in particular resistance to highlighter pens.

The present invention further relates to an inkjet ink set which comprises various inkjet ink compositions and includes the inkjet ink composition of the present invention. The inkjet ink compositions of this set may differ in any way known in the art. For example, the inkjet ink set may comprise inkjet ink compositions comprising different types and/or colors of colorants, including, for example, an inkjet ink composition comprising a cyan pigment, an inkjet ink composition comprising a magenta pigment, and/or an inkjet ink composition comprising a black pigment. Other types of inkjet ink compositions may also be used, including, for example, compositions comprising agents designed to fix the inkjet ink compositions onto the substrate. Other combinations will be known in the art.

The present invention will be further clarified by the following examples, which are intended to be only exemplary in nature.

EXAMPLES

Example 1

The following example describes the preparation of an inkjet ink composition comprising a liquid vehicle and a modified colorant of the present invention. In this example, the inkjet ink composition comprises at least one colorant and at least one polymer prepared by the polymerization of a monomer comprising a bisphosphonic acid group or salts thereof.

Synthesis of a Bisphosphonate Monomer

A 1 L-3-neck round bottom flask was fitted with a thermometer and an addition funnel. The flask was charged with a solution of 39 g of NaOH and 97.5 g of sodium alendronate (the monosodium salt of a 4-amino-1-hydroxybutane-1,1-diyl)bisphosphonic acid, commercially available from Zentiva, Prague, Czech Republic) in 600 g of water. The solution was stirred and cooled down to approximately 5° C. using an ice bath. Methacryloyl chloride (39.3 g) was added dropwise via the addition funnel while keeping the temperature below 10° C. The reaction was stirred for 20 minutes. To this was added 37% HCl (approximately 44 g) until the pH decreased to approximately 3.4. The solution was then extracted with dichloromethane (3×300 mL). The aqueous phase was mixed with approximately 3 L of Ethanol, and the desired bisphosphonate monomer product precipitated as a white solid, which was collected by filtration and dried in a vacuum oven at 60° C.

Synthesis of a Polymer

A copolymer was prepared using semi-continuous feed techniques. In a 500 mL three-neck round-bottom flask equipped with an addition funnel, a thermocouple, and a rubber septum was charged with 60 mL DMF, and the temperature was increased and maintained at 100° C. The addition funnel was charged with a solution of a mixed monomer solution of 2-hydroxypropyl acrylamide (15 g) and t-octylacrylamide (27.5 g) in 50 mL of DMF. Two other feed streams were dispensed from syringes through the septum. One feed stream contained a solution of the bisphosphonate monomer described above (7.5 g) in 30 mL water, to which water was added over the course of the polymerization as needed in order to maintain solubility. The second feed stream was an initiator solution of benzoyl peroxide (1.5 g) in 25 mL DMF. Ten percent of each feed stream was added to the reaction flask. After thirty minutes, 1/12 of the initiator solution and the mixed monomer solution were added. After another thirty minutes, 1/12 of all three feed streams were added, and this continued, maintaining the temperature, for another 5 hours. At the end of the reaction, the last 1/12 of the bisphosphonate monomer solution was added. The reaction was maintained for an additional hour before cooling to room temperature. The resulting polymer precipitated during the reaction, and was isolated by pouring off the supernatant. The solids were rinsed with hexanes to drive off the high-boiling DMF and dried under vacuum for 14 hours. The polymer, comprising repeating units having bisphosphonate groups, was used as is for the preparation of an inkjet ink composition.

Modified Colorant

A pigment comprising at least one polymer was prepared by adding to an Eiger 1 H Laboratory vessel (5.5 inch diameter stainless steel beaker) 9.5 g of Black Pearls® 700 carbon black (commercially available from Cabot Corporation), a solution of 11.4 g of polymer above and 100 mL of NMP, and 2000 g of Norstone milling media (BSLZ-1 0.07-0.125 mm, commercially available from Norstone, Wyncote, Pa.). The mixture was milled at 5000 rpm, with addition of NMP as needed to keep the mixture fluid, for 20 minutes. To this was added 6.66 g of a 10% aqueous sodium hydroxide solution, along with 500 mL of deionized water, and milling was continued for an additional 15 minutes. The mixture, which contained the pigment comprising a polymer, was filtered to remove the milling media. The resulting dispersion had a total volume of 3 L, including the water used to rinse the milling media.

This dispersion was concentrated to 300 mL by diafiltration using a Spectrum Membrane (1050 cm²) and a peristaltic pump. The dispersion was further purified by diafiltration with 10 volumes nanopure water. The dispersion was sonicated for an hour using a Misonix 3000 sonicator using the microtip at power 5.5, and a pulse cycle of 8 seconds on, 2 seconds rest. The resulting dispersion of the modified colorant, which is a pigment comprising at least one polymer (16.07% solids) was found to have a mean volume particle size (mV), determined using a Microtrac® Particle Size Analyzer, of 160 nm.

The amount of polymer coated on the pigment was determined by comparing the UV/Vis absorbance of the polymer-coated pigment in a dispersion of a known concentration to that of a dispersion of the starting pigment at the same concentration, using a wavelength where the pigment absorbs. For the modified colorant used in this example, a wavelength of 550 nm was chosen for absorbance measurements on the UV/Vis Spectrophotometer. The extinction coefficient for both the polymer-coated pigment and the starting pigment will be the same. Since both dispersions are at the same concentration, any observed decrease in absorbance must be due to a difference in the actual amount of pigment in the polymer-coated pigment dispersion. This difference is the amount of polymer present and can be reported as % polymer. For the colorant composition of this example, the amount of polymer coated on the pigment was found to be 38.68% polymer by this UV method. This modified colorant was used to prepare an inkjet ink composition of the present invention.

Inkjet Ink Compositions

An inkjet ink composition of the present invention was prepared using the formulation shown in Table 1 below.

TABLE 1

| Component | Amount |
| --- | --- |
| Dispersion of Modified Colorant | 13.69 g |
| Glycerol | 3 g |
| 1,2-hexanediol | 1.5 g |
| Surfynol 465 | 0.3 g |
| Water | 11.51 g |

This inkjet ink composition was loaded into an Epson compatible cartridge (available from Inkjet Warehouse, black cartridge part number E-0601-K) and printed using an Epson C88 printer with print settings "plain paper/best photo/ICM off".

Print performance properties were determined for the resulting printed images. Optical density was measured using a SpectroEye Spectrodensitometer. The settings used were used: Illumination at D65, 2 degree standard observer, DIN density standards, white base set to Abs, and no filter. Results are reported as an average of three optical density measurements taken at two corners, and the middle of a page. Smear resistance was measured on high optical density stripes using a yellow Avery Fluorescent Hi-Lighter™ Chisel Point #111646 and an orange ACCENT™ Highlighter Fluorescent Chisel Tip #25006. For each highlighter, two swipes were made on an unprinted section of paper, and then two swipes were made across three 2 mm wide stripes printed 2 mm apart using the specified inkjet ink composition. The highlighter pen was cleaned between swipes on a piece of scrap paper. Smear resistance was visually evaluated to assess visible evidence of smearing from the printed stripe within the highlighter swipe: "yes"=noticeable smearing is observed, "trace"=a slight amount of smearing is seen, and "no"=no smearing is found.

Images printed on Hammermill Copy Plus paper were found to have on OD of 1.4, and no smear was observed.

Thus, the inkjet ink composition of the present invention has good overall performance, with a balance of high OD and high smear resistance.

Example 2

The following example describes the preparation of an inkjet ink composition comprising a liquid vehicle and a modified colorant of the present invention. In this example, the inkjet ink composition comprises at least one colorant and at least one polymer prepared by the polymerization of a monomer comprising a benzene tricarboxylic acid group or salts thereof.

Synthesis of a Benzene Tricarboxylic Acid Monomer

To a 2 L three-neck round bottom flask equipped with a magnetic stir bar, thermometer, and a 250 mL addition funnel was charged 1 L water and 71 g sodium hydroxide pellets. When this had dissolved, 100 g of 1-aminobenzene-3,4,5-tricarboxylic acid was added, which also dissolved. When the heat of neutralization dissipated, the reaction was cooled to 10° C. with an ice bath. Methacryloyl chloride (40.23 g) was charged to the addition funnel. This was added to the reaction vessel dropwise, over fifteen minutes, maintaining a temperature of less than 15° C. In a separate vessel, 40 g of sodium hydroxide was dissolved in 150 g water. This was added to the reaction mixture 20 minutes after the methacryloyl chloride addition was complete. Once the reaction had cooled to 10° C., an additional 40 g of methacryloyl chloride was added dropwise from the addition funnel over fifteen minutes, keeping the temperature under 15° C. Twenty minutes after the addition was complete, the reaction mixture was acidified to a pH of 3 with concentrated HCl. The resulting solids were collected by vacuum filtration, washed with ethanol, and dried in a vacuum oven at 60° C. for 14 hours.

Synthesis of a Polymer

A copolymer was prepared using modified semi-continuous feed techniques. The acrylamido-benzenetricarboxylic acid monomer described above was dissolved (7% solids) in DMSO by stirring 14 hours with acidic Amberlite resin that was first washed with DMSO to remove impurities. Into this solution, butyl acrylate and nitrophenyl acrylamide were dissolved, so that the weight ratios of the monomers were 28.7 weight percent acrylamido-benzenetricarboxylic acid monomer, 68.3 weight percent butyl acrylate and 3 weight percent nitrophenyl acrylamide. A small amount (3% by weight based on total monomer feed) of mesitylene was also added to serve as an internal standard for NMR analysis. One tenth of the solution was charged to a three-neck, round-bottom flask equipped with a thermostatted heating mantle with thermocouple, an addition funnel, and a septum-capped ground-glass joint. The balance of the solution was charged to the addition funnel. 3% by weight on total monomer of 4,4'-azobiscyanovaleric acid (ACVA), dissolved at 10% solids in DMSO was charged to a hypodermic syringe. The reaction mixture was heated to 105° C., and one tenth of the ACVA solution was added to the reaction mixture. One tenth of the remaining monomer solution, and remaining initiator solution, was added every half an hour for five hours, after which the temperature was maintained at 105° C. for one hour, and then allowed to cool. The resulting polymer, comprising repeating units having benzenetricarboxylic acid groups, was collected by precipitation into 5% by weight acetic acid in water, and washing the solids twice with distilled water. The inherent viscosity of the polymer was 0.066 dL/g in THF, and the acid number was 131 mg/KOH polymer.

The polymer was hydrogenated in THF solution (10% solids) by first purging with nitrogen for 10 min. To the above solution 10% palladium on carbon catalyst (2.5 g) was added and the mixture was hydrogenated on Parr apparatus at 45 psi for 3-4 hours. The resulting polymer was used as is for the preparation of an inkjet ink composition.

Modified Colorant

To a 500 mL stainless steel beaker was added 20 g Black Pearls® 700 carbon black. The polymer described above (20 g) was dissolved in 132 g THF, and the resulting solution along with 48 g THF and 20 g water were added to the carbon black in the stainless steel beaker. This mixture was agitated with a propeller blade and a rotor-stator, and heated to a temperature of 55° C. In a separate vessel 0.25 g sodium nitrite was dissolved in 16 g of water. Methanesulfonic acid (0.35 g) was added to the agitating mixture, and the sodium nitrite solution was added dropwise over 5 minutes. The mixture was maintained at 55° C. with agitation for 2 hours. The reaction mixture was then added to a polyethylene vessel containing 800 mL of THF with manual agitation. The resulting solids were collected by centrifugation and washed twice with THF. The solids were dispersed in 500 mL water at pH 9 with a sonic probe for 30 minutes. The resulting dispersion was classified by passing through a 20 micron screen, and diafiltered with 10 volumes of water (approximately 5 liters). The resulting dispersion of modified colorant, which is a pigment comprising at least one polymer was found to have a mean volume particle size (mV), determined using a Microtrac® Particle Size Analyzer, of 192 nm, and. The modified pigment was found to have 12.1% volatiles, determined by TGA.

Comparative Modified Colorant

Black Pearls® 700 carbon black (500 g), 81 g of 1-amino-3,4,5-benzenetricarboxylic acid, and 650 g of water was charged to a ProcessAll 4HV Mixer (4 liter) which was held at 50° C. The mixer was sealed and agitation was started (300 RPM). In a separate vessel, 17.28 g sodium hydroxide was dissolved in 200 g of water. This sodium hydroxide solution was added to the mixer during agitation. In a third vessel 24.84 g sodium nitrite was dissolved in 75.16 g water. When the contents of the mixer were at 50° C., the sodium nitrite solution was pumped into the mixer over 15 minutes. The temperature and agitation were maintained for two hours. At the end of the 2 hours, the mixer was opened, and 61 g of 4-aminobenzyl amine were added. The mixer was sealed and agitated for five minutes, after which the vessel was again opened and a further 61 g of 4-aminobenzyl amine was added. The sealed mixture was agitated another ten minutes. In a separate vessel, 180 g of 70% aqueous nitric acid was mixed with 180 g water, and this solution was pumped into the agitated vessel over five minutes. The pump line was rinsed with 50 mL water, and agitation was maintained for 15 minutes, during which the temperature was raised to 60° C. In another vessel 69 g of sodium nitrite were dissolved in 276 g water, and this sodium nitirite solution was pumped into the mixer over 15 minutes. The temperature and agitation were maintained for two hours, and then 200 g water was added and mixed for fifteen minutes. The resulting slurry was removed from the mixer, and the mixer was rinsed twice with 1 L of water, with each rinse being added to the slurry, resulting in 4,645 g of slurry. One half of this, approximately 2,323 g was diluted with water to a volume of 3.5 L and stirred with a paddle blade for 20 minutes. This slurry was filtered with a Buchner funnel and Whatman 1 filter paper, slurried with fresh water, and recombined with the unwashed slurry, resulting in a dispersion that was 11.88% solids comprising a modified pigment having attached benzene tricarboxylic acid groups.

Inkjet Ink Compositions

The dispersion of the modified colorant of the present invention and the comparative modified colorant were used to make inkjet ink compositions containing 4% carbon black (with solids at 4.2-4.6%), 7% glycerin, 7% trimethylolpropane, 5% diethylene glycol, 1% Surfynol® 465 surfactant with the balance as water. These inks were loaded into cartridges and printed with a Canon I550 printer onto four different papers—Hammermill Copy Plus (HCP), Hammermill Premium Inkjet (HPI), Xerox 4200 and HP Bright White (HPBW). The resulting images were evaluated for optical density (measured using ImageXpert™) and resistance to highlighter smear ("good" means little or no smear and "poor" means a significant amount of visible smear), and the results are shown in Table 2 below.

TABLE 2

| Modified Pigment | Average OD | Highlighter resistance | |
| --- | --- | --- | --- |
| | | Orange | Yellow |
| Example 2 | 1.33 | Good | Good |
| Comparative Colorant | 1.35 | Poor | Poor |

As the results show, the inkjet ink composition of the present invention, comprising a modified pigment which comprises a pigment and polymer having an aryl tricarboxylic acid group, produces printed images having comparable OD to printed images produced from an inkjet ink composition comprising a modified pigment which comprises a pigment having attached a similar organic group but no polymeric group. However, improved highlighter resistance was observed for images from the inkjet ink composition of the present invention. Thus, these inkjet ink compositions have good balance of OD and highlighter resistance.

Example 3

The following example describes the preparation of an inkjet ink composition comprising a liquid vehicle, a modified pigment, and a polymer having at least two phosphonic acid groups, or salts thereof.

In a 1 L Erlenmeyer flask was added 100 g of Joncryl 683 (a styrene acrylate copolymer available from BASF, total acid of 295 mmol) and 25.4 g of N-hydroxysuccinimide (HOSI, 220 mmol, 0.75 eq. of available acid group of the polymer) in 600 mL of anhydrous THF. The solution was stirred at ambient temperature while 45 g of N,N'-dicyclohexyl-carbodiimide (DCC, 20 mmol, 0.75 eq.) in 100 mL of THF was added slowly. After stirring at room temperature overnight, the mixture was filtered to remove the dicyclohexylurea (DCU) precipitate and the resulting activated Joncryl polymer solution was used without further purification.

214.18 g of a 11.67% solids dispersion of Pigment Red 122 modified with 4-aminobenzylamine (4-ABA, 2 mmol/g treatment level) was added to a 1 L stainless steel beaker. To this was added 15.04 g of alendronate sodium (the monosodium salt of a 4-amino-1-hydroxybutane-1,1-diyl)bisphosphonic acid, commercially available from Zentiva, Prague, Czech Republic). The sample was mixed with a Silverson L4RT mixer at 6000 RPM for 15 minutes.

Next, 87.53 g (at 28.5% solids) of the activated Joncryl polymer solution was added to the mixture, and the pH was adjusted to approximately 8.5-9.0 with a 2M NaOH solution. The material was mixed with a Silverson mixer for 3 hours at 7000-7500 RPM at 50°–60° C. Continuous addition of 2M NaOH solution was used to maintain the pH at 8.5-9.0 during the 3 hours. The mixture was then pH adjusted to 10 with a 2M NaOH solution and mixed for another 1 hour at 60° C. while maintaining pH. Also, 2-ethyl-1-hexanol could periodically be added to control foaming.

The pigment mixture was sonicated using a Misonix sonic probe at the maximum setting for 1 hour, filtered through a 45 μm sieve, and diafiltered with 0.0001M NaOH at 400 mL/volume for 10 volumes. The dispersion was then diafiltered with DI $H_2O$ at 400 mL/volume for 10 volumes, and sonicated using the sonic probe for 2 hours at setting 10. The sample was then centrifuged for 40 minutes at 4500 RPM, yielding a red pigment dispersion having a solids level of 12.33%, a sodium level measured by sodium probe of 13535 ppm/solids, and a polymer attachment level measured as described in Example 1 of 50.53% based on the total weight of the modified pigment.

It would be expected that this dispersion could be used in an inkjet ink composition. Furthermore, the dispersion comprises both a polymer having a bisphosphonic acid functional group as well as a modified red pigment comprising a red pigment having attached at least one polymeric group, wherein the polymeric group comprises this polymer. This is because both the starting modified red pigment (having an attached amine group) and the alendronate sodium (also having an amine group) would be expected to compete for the activated Joncryl polymer. Therefore, using the resulting modified red pigment dispersion would be expected to produce an inkjet ink composition of the present invention, comprising a liquid vehicle, a modified pigment, and a polymer having at least one functional group comprising a bisphosphonic acid group, or salt thereof.

Example 4

This example describes methods for determining calcium index values.

Method A

For this method, a series of solutions were prepared at pH 9 that contained 0.087 mM Congo Red indicator, 5 mM cesium chloride, 1 wt % MW350 polyethylene glycol methyl ether, and calcium chloride in concentrations ranging from 0 to 7 mM (0.2, 0.5, 1, 2, 3, 4, 4.5, 5, 6, and 7 mM). The UV-Vis spectra of these solutions were recorded within 1 hour of their preparation using a UV-2501PC. These spectra were used to create a calibration curve relating the absorbance at 520 nm to the calcium concentration.

A compound was then chosen that corresponds to a specific organic group attached to a polymer. For example, for a modified carbon black comprising a polymer having attached a 3,4,5 tricarboxyphenyl group or salts thereof, 1,2,3-benzene tricarboxylic acid would be chosen. Test solutions were then prepared at pH 9 that contained 0.087 mM Congo Red indicator, 1 wt % MW350 polyethylene glycol methyl ether, 5 mM calcium chloride, and the cesium salt of the compound of interest such that the ion concentration at pH 9 was 5 mM. The uncomplexed calcium concentration was determined by comparison with the calibration curve. The calcium index value was then calculated as $\log_{10}((0.005-\text{uncomplexed calcium})/((\text{uncomplexed calcium})^2))$. Measurements were made in duplicate and averaged.

Using this method, the calcium index values of various compounds, relating to the organic groups of modified pigments comprising pigments having these organic groups attached, were determined and are shown in Table 3A below.

TABLE 3A

| Compound | Calcium index value |
| --- | --- |
| Toluene sulfonic acid | 0.78 |
| benzoic acid | 1.27 |
| isophthalic acid | 1.76 |
| phthalic acid | 2.05 |
| 1,1,1-trifluoro-2,4-pentanedione | 2.33 |
| succinic acid | 2.37 |
| benzohydroxamic acid | 2.43 |
| 1,2,4-benzene tricarboxylic acid | 2.53 |
| Benzenephosphonic acid | 2.53 |
| malonic acid | 2.58 |
| 1,2,3-benzene tricarboxylic acid | 2.79 |
| 2,3-dihydroxypyridine | 3.06 |
| 8-hydroxyquinoline | 3.08 |
| 2-hydroxypyridine oxide | 3.27 |
| methylene diphosphonic acid | 3.45 |

Thus, as the data in Table 3A shows, compounds such as 2-hydroxypyridine N-oxide (1-hydroxy pyridone), 8-hydroxyquinoline, and methylene diphosphonic acid have calcium index values greater than that of 1,2,3-benzene tricarboxylic acid. These also have calcium index values greater than or equal to that of benzene phosphonic acid (phenylphosphonic acid), as do compounds such as 1,2,4-benzene tricarboxylic acid and malonic acid. Compounds comprising these or similar groups, such as other bisphosphonates or groups having at least two phosphonic acid groups, partial esters thereof, or salts thereof, would also be expected to have similarly high calcium index values.

Method B

For compounds which develop a high level of color and are therefore difficult to use in Method A, a second method was developed. For this method, an aqueous solution that was 0.01M in $^{43}CaCl_2$, 0.01M in NaCl, 10% $D_2O$ and at pH 8 or 9 was prepared from $^{43}CaCO_3$, $HCl/D_2O$, $NaOH/D_2O$, $D_2O$ and water. The pH was chosen to ionize the compound under investigation and to dissolve the compound. A portion of the solution weighing about 0.65 g was added to a 5 mm NMR tube and weighed to the nearest 0.001 g. The chemical shift of the unbound $^{43}Ca$ was measured using a Bruker Avance II spectrometer with a proton resonance frequency at 400.13 MHz. A 0.2-1.0M solution of the compound (ligand) under investigation was added in successive increments. After each addition, the $^{43}Ca$ chemical shift was measured, and δ, the difference between the chemical shift of the sample and that of unbound calcium was calculated. The successive increments were planned such that the $L_o/Ca_o$ ratio was 0.25, 0.5, 1, 2, 3, 4, 6 and 8 where $L_o$ is the total concentration of complexed, protonated and free anions from the ligand and $Ca_o$ is the total concentration of calcium in all species present. The calcium binding index (NMR) was calculated as $\log_{10}(X)$ where X was determined by fitting the parameters X and $\delta_m$ in the equation $$\delta = \frac{\delta_m}{2}\{[1+(L_0/Ca_0)+(1+H^+/K_a)/(XCa_0)] - \sqrt{[1+(L_0/Ca_0)+(1+H^+/K_a)/(XCa_0)]^2 - 4(L_0/Ca_0)}\}$$

so that the RMS difference between the data and the predicted chemical shifts from the equation are minimized where δ is the difference in the $^{43}$Ca chemical shift of the sample vs that of free aqueous $^{43}$Ca$^{2+}$ $δ_m$ is the calculated difference in the $^{43}$Ca chemical shift at infinite L/Ca vs that of free $^{43}$Ca$^{2+}$ $L_o$ is the total concentration of complexed, protonated and free anions from the ligand $Ca_o$ is the total concentration of calcium in all species present X is a fitting parameter $K_a$ is the proton dissociation constant for the ligand LH Using this method, the calcium index values of various compounds, relating to the organic groups of modified pigments comprising pigments having these organic groups attached, were determined and are shown in Table 3B below.

TABLE 3B

| Compound | Calcium index value |
|---|---|
| benzoic acid | 0.58 |
| 1,2,3-benzene tricarboxylic acid | 1.99 |
| 2-chloro-4-methyl-6-nitrosophenol | 2.22 |

The calcium index values by Method B are different than those done by Method A and cannot be compared directly with them.

Example 5

The following example describes a method for the preparation of a polymer that can be used for preparing a modified colorant and/or and inkjet ink composition of the present invention.

Synthesis of an Initiator 4,4'-Azobis(4-cyanovaleric acid) (10 g, 35 mmol) was added to thionyl chloride (20 ml). The reaction mixture was refluxed at 80° C. for 40 min or until solids are completely dissolved. The hot solution was immersed in an ice bath and cooled to room temperature. The solution was poured into cold hexane (200 ml) and stirred for 4 hours at 5° C. to allow product to precipitate. The precipitate was filtered and washed with cold hexane (200 ml) to yield 4,4'-azobis(4-cyanovaleric acid chloride) as a white solid (11.2 g, 99%).

p-Phenylenediamine (8.47 g, 78 mmol) was dissolved in dry THF (500 ml) and triethylamine (7.92 g, 78 mmol) was added. The reaction mixture was cooled to 5° C. using ice/water bath. A solution of 4,4'-azobis(4-cyanovaleric acid chloride) (11.2 g, 35 mmol) in 100 ml THF was added dropwise to the above mixture over 0.5 hour.

After the addition was complete, the reaction mixture was stirred for another 2 hours at 0-5° C. The precipitate (triethylamine hydrochloride) was filtered off and washed with 200 ml of THF. The filtrate was partially concentrated (about half of the solvent was evaporated), and diluted with water (300 mL). 37% HCl is added to the solution until pH decreased to 2. The resulting solution was washed with ethyl acetate (2×200 ml), and the pH of the aqueous layer was adjusted to 5 using 40% NaOH. The resulting solution was extracted with ethyl acetate (2×300 ml), and the combined organic layers were concentrated to yield 4,4'-azobis(N-p-aminophenyl-4-cyanovaleramide) (4.0 g, 25% yield).

Synthesis of a Bisphosphonate Monomer

A tetrabutyl ammonium cation exchange resin is prepared by stirring a 5-fold molar excess of tetrabutyl ammonium hydroxide with a protic exchange resin for 14 hours, at 60° C. The resulting tetrabutyl ammonium resin was washed until the pH of the rinse water is 7. This resin was then stirred with the bisphosphonate monomer of Example 1, 10% by weight in water, in a 10-fold molar excess at 80° C. for 14 hours. The resulting salt, tris(tetrabutyl ammonium) alondronate methacrylamide, was recovered by washing the resin with 10 volumes of water, and evaporating the water.

Synthesis of a Polymer

A copolymer was prepared by dissolving 10 g of the above tris(tetrabutyl ammonium) alondronate methacrylamide, 1.71 g of isopropyl acrylamide, 8.29 g of butyl acrylate, 1.0 g of octanone (internal standard for GC), and 0.08 g aminothiphenol in 50 mL dimethylformamide, giving a total volume of 75 mL. Dimethylformamide (6 mL) was charged to a 250 mL round bottom flask equipped with a spin bar, a nitrogen inlet, an addition funnel, and a septum. The temperature was termostatted at 95-96° C. for the duration of the reaction. The DMF solution of monomers was charged to the addition funnel. 4,4'-azobis(N-p-aminophenyl-4-cyanovaleramide, prepared above, (0.2 g) was dissolved in 9.5 mL DMF, and charged to a hypodermic syringe, which was inserted into the septum-capped port of the reaction vessel. Twenty percent of the total volume of the addition funnel (ca 15 mL) was added to the reaction vessel. At the same time, 1 mL of the initiator solution was added. Additions were carried out according to the schedule shown in Table 4 below:

TABLE 4

| Time (hr) | Monomer solution added | Initiator added |
|---|---|---|
| 0 | 15 | 1 |
| 1 | 9 | 0.5 |
| 3 | 0 | 0.5 |
| 4 | 0 | 0.5 |
| 5 | 0 | 0.5 |
| 6 | 0 | 0.5 |
| 7 | 9 | 0.5 |
| 8 | 8 | 0.5 |
| 9 | 9 | 0.5 |
| 10 | 7 | 0.5 |
| 10.5 | 5 | 0.5 |
| 11 | 5 | 0.5 |
| 11.25 | 0 | 0.5 |

After the additions were complete, the reaction mixture was allowed to cool to room temperature. The reaction mixture was subjected to rotorary evaporation to remove any unreacted butyl acrylate, and then 1 mL of the reaction mixture was diluted with 5 mL of water and placed in a dialysis bag (MW cutoff 1000) and dialyzed against 50 mM sodium nitrate solution for 14 hours, then against distilled water for 24 hours. The resulting solution was 0.56% solids, and the polymer was found to be 3% by weight phosphorous, corresponding to 60 meq ionic charge/g polymer. This polymer solution could be used without further purification for preparing a modified colorant, such as a modified pigment, of the present invention as well as an inkjet ink composition of the present invention.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A modified colorant comprising a pigment and a polymer having at least one functional group having a calcium index value greater than or equal to a calcium binding index value of 1,2,3-benzene tricarboxylic acid, wherein the polymer is a coating on the pigment,
   wherein the functional group comprises at least one geminal bisphosphonic acid group, partial esters thereof, or salts thereof, and
   wherein the polymer comprises at least one monomer comprising the functional group.

2. The modified colorant of claim 1, wherein the functional group comprises at least one group having the formula —CQ($PO_3H_2$)$_2$ or salts thereof, wherein Q is H, R, OR, SR, or $NR_2$ wherein R, which can be the same or different, is H, a $C_1$-$C_{18}$ alkyl group, a $C_1$-$C_{18}$ acyl group, an aralkyl group, an alkaryl group, or an aryl group.

3. The modified colorant of claim 2, wherein the functional group comprises at least one group having the formula —($CH_2$)$_n$—CQ($PO_3H_2$)$_2$ or salts thereof, wherein n is 1 to 9.

4. The modified colorant of claim 3, wherein n is 1 to 3.

5. The modified colorant of claim 2, wherein the functional group comprises a group having the formula -Sp-($CH_2$)$_2$—CQ($PO_3H_2$)$_2$ or salt thereof, wherein Sp is a spacer group and wherein n is 0 to 9.

6. The modified colorant of claim 5, wherein Sp is —$CO_2$—, —$O_2$C—, —O—, —NR"—, —NR"CO—, —CONR"—, —$SO_2CH_2CH_2$NR"—, —$SO_2CH_2CH_2$O—, or —$SO_2CH_2CH_2$S—, wherein R" is H or a $C_1$-$C_6$ alkyl group.

7. The modified colorant of claim 1, wherein the functional group comprises at least one group having the formula —N—[($CH_2$)$_m$($PO_3H_2$)]$_2$ or salts thereof, wherein m, which can be the same or different, is 1 to 3.

8. The modified colorant of claim 7, wherein the functional group comprises at least one group having the formula —($CH_2$)$_n$—N—[($CH_2$)$_m$($PO_3H_2$)]$_2$ or salts thereof, wherein n is 1 to 9.

9. The modified colorant of claim 7, wherein the functional group comprises a group having the formula -Sp-($CH_2$)$_n$—N—[($CH_2$)$_m$($PO_3H_2$)]$_2$ or salts thereof, wherein Sp is a spacer group and wherein n is 0 to 9.

10. The modified colorant of claim 9, wherein Sp is —$CO_2$—, —$O_2$C—, —O—, —NR"—, NR"CO—, —CONR"—, —$SO_2CH_2CH_2$NR"—, —$SO_2CH_2CH_2$O—, or —$SO_2CH_2CH_2$S—, wherein R" is H or a $C_1$-$C_6$ alkyl group.

11. The modified colorant of claim 1, wherein the functional group comprises at least one group having the formula —CR=C($PO_3H_2$)$_2$ or salts thereof, wherein R is H, a $C_1$-$C_6$ alkyl group, or an aryl group.

* * * * *

UNITED STATES PATENT AND TRADEMARK OFFICE
CERTIFICATE OF CORRECTION

PATENT NO. : 9,963,592 B2
APPLICATION NO. : 15/643605
DATED : May 8, 2018
INVENTOR(S) : Elizabeth G. Burns et al.

Page 1 of 1

It is certified that error appears in the above-identified patent and that said Letters Patent is hereby corrected as shown below:

In the Claims

At Column 31, Line 27, that portion reading "(CH2)2" should read -- (CH2)n --.

Signed and Sealed this
Fifth Day of March, 2019

Andrei Iancu
*Director of the United States Patent and Trademark Office*